United States Patent Office 3,127,411
Reissued Mar. 31, 1964

3,127,411
PROCESS FOR THE PREPARATION OF N-CARBOXYGLYCINE ANHYDRIDE
Edward E. Schmitt, South Norwalk, Conn., assignor to American Cyanamid Company, Stamford, Conn., a corporation of Maine
No Drawing. Filed May 18, 1962, Ser. No. 196,002
2 Claims. (Cl. 260—307)

The present invention relates to a process for the preparation of N-carboxyglycine anhydride. More specifically, it relates to a process for preparing N-carboxyglycine anhydride utilizing a substituted-amino acid in a solvent environment so as to ring-close said amino acid derivative.

It is well known that N-carboxyglycine anhydride has a relatively short shelf-life. Accordingly, this anhydride is usually prepared when required for further synthesis, as for instance, either in the preparation of homo- or copolymers, or in the preparation of polypeptide for food, fibers or medicinals. Unfortunately, known attempts to prepare the anhydride are relatively laborious, hazardous and economically unfeasible.

It is, therefore, an object of the present invention to overcome the prior laborious practice by providing a straightforward process for preparing N-carboxyglycine anhydride.

According to the process of the present invention, a specific substituted-amino acid, namely, benzyloxy-carbonyl glycine, is dissolved in thionyl chloride. Mere dissolution of the amino acid results in a slight exothermic reaction. To accelerate the reaction, it is preferred to gently heat the solution to a temperature from about 28° C. to about 40° C. until a needle-like precipitate begins to form. Thereafter, the mixture is cooled to 0° C. or below. The reaction mass is maintained at the reduced temperatures for from one to three hours. N-carboxyglycine anhydride is obtained in good yield and purity.

As mentioned above, it is a good practice to recover desired N-carboxyglycine anhydride at temperatures below about 0° C. A good operating range is in the neighborhood from minus (—) 10° C. to about minus (—) 100° C.

In order to facilitate a further understanding of the invention, the following example is presented primarily for the purpose of illustrating certain more specific details thereof. The scope of the invention is not to be deemed limited thereby except as defined in the claims. Unless otherwise stated, the parts are by weight.

*Example*

Ten parts of benzyloxycarbonyl glycine are dissolved in 50 parts of thionyl chloride while gently heating the mixture to about 30° C. A mild exothermic reaction is observed and evolution of gas from the solution is noted. Within approximately five minutes, the reaction is complete and a needle-like precipitate begins to form. After chilling at minus (—) 13° C. for two hours, N-carboxyglycine anhydride, which decomposes at about 105° C., is obtained in a yield of 70%. Upon analysis, the following is found in percent.

Calculated for $C_3H_3NO_3$: C, 35.64; H, 2.97; N, 13.86.
Found: C, 35.91; H, 2.94; N, 13.61.

I claim:
1. A process for the preparation of N-carboxyglycine anhydride which comprises: admixing benzyloxycarbonyl glycine with sufficient thionyl chloride to dissolve the latter glycine; ring-closing and precipitating N-carboxyglycine anhydride therein; cooling said mixture to between about 0° C. and about minus (—) 100° C.; and thereafter recovering said anhydride in the form of needle-like crystals in good yield and purity.
2. A process according to claim 1, wherein ring-closure involving the admixed benzyloxycarbonyl glycine dissolved in thionyl chloride occurs within the temperature range from between 28° C. to about 40° C.

References Cited in the file of this patent
UNITED STATES PATENTS

| | | |
|---|---|---|
| 2,516,145 | Prichard | July 25, 1950 |
| 2,560,584 | MacDonald | July 17, 1951 |
| 2,649,458 | Bennett et al. | Aug. 18, 1953 |